Figure 1:
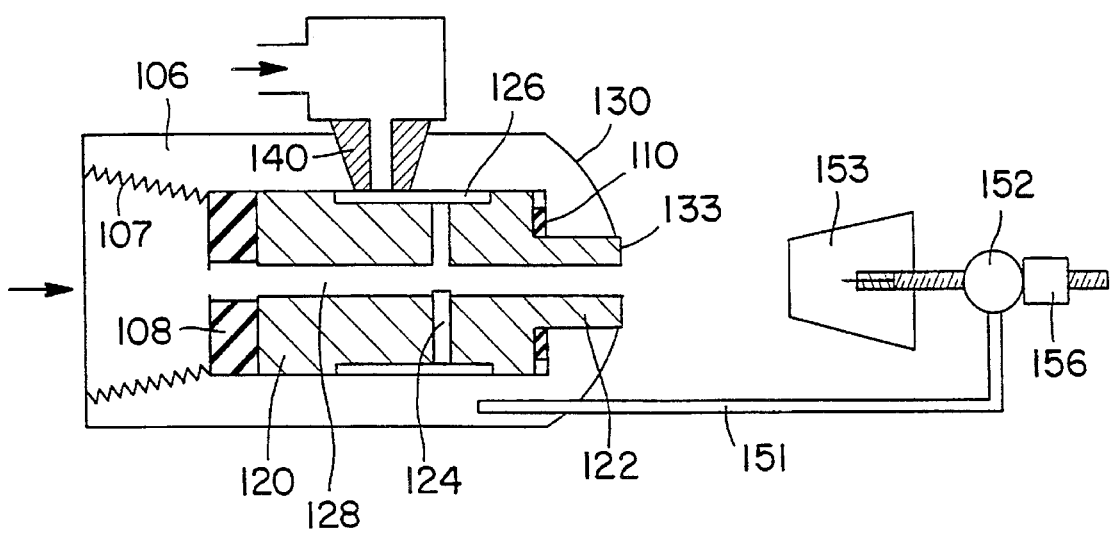

United States Patent [19]
Munk

[11] Patent Number: 5,501,401
[45] Date of Patent: Mar. 26, 1996

[54] ULTRASONIC FOGGING DEVICE WITH AGITATION CHAMBER

[76] Inventor: Michael Munk, 130 Gun Club Rd., Stamford, Conn. 06903

[21] Appl. No.: 218,932

[22] Filed: Mar. 29, 1994

[51] Int. Cl.⁶ ............................... B05B 7/04; B05B 1/26
[52] U.S. Cl. .................... 239/431; 239/434; 239/505; 239/524
[58] Field of Search ................. 239/102.1, 429, 239/430, 431, 433, 434, 505, 507, 512, 513–515, 518, 521, 524

[56] References Cited

U.S. PATENT DOCUMENTS

| | | | |
|---|---|---|---|
| 3,084,874 | 4/1963 | Jones et al. | 239/524 X |
| 3,693,887 | 9/1972 | Brodlin et al. | 239/524 X |
| 3,747,851 | 7/1973 | Conrad | 239/524 X |
| 4,042,016 | 8/1977 | Boochever et al. | 165/20 |
| 4,058,253 | 11/1977 | Munk et al. | 236/46 R |
| 4,118,945 | 10/1978 | Boochever et al. | 62/176 C |
| 4,561,380 | 12/1985 | Mulder et al. | 239/524 X |
| 4,564,375 | 1/1986 | Munk et al. | 55/259 |
| 4,667,465 | 5/1987 | Munk | 60/39.3 |
| 4,702,074 | 10/1987 | Munk | 60/39.511 |
| 4,731,988 | 3/1988 | Munk | 60/39.3 |
| 4,731,990 | 3/1988 | Munk | 60/39.05 |
| 4,773,846 | 9/1988 | Munk | 431/4 |
| 5,277,707 | 1/1994 | Munk et al. | 95/8 |
| 5,326,254 | 7/1994 | Munk | 431/115 |

FOREIGN PATENT DOCUMENTS

| | | | |
|---|---|---|---|
| 654296 | 4/1979 | U.S.S.R. | 239/512 |
| 9012651 | 11/1990 | WIPO | 239/524 |

*Primary Examiner*—Andres Kashnikow
*Assistant Examiner*—Lesley D. Morris
*Attorney, Agent, or Firm*—Martin M. Novack

[57] ABSTRACT

An ultrasonic fogger with a generally cylindrical body having an axial bore therethrough with an inlet at a rear face of the body and an outlet at a front face of the body. A gas is supplied to the inlet end of the bore. A chamber in the body is in communication with the bore, and a liquid supply is coupled to the chamber. A resonator is spaced from and opposes the outlet end of the bore. The chamber acts to pre-shear, through agitation, the liquid stream from the liquid supply.

18 Claims, 6 Drawing Sheets

ULTRASONIC FOGGING DEVICE WITH AGITATION CHAMBER

BACKGROUND OF THE INVENTION

This invention relates to fogging devices and systems and, more particularly, to improvements in such devices and systems which increase operating efficiency and reduce noise. The subject matter of this Application is related to subject matter disclosed in my copending U.S. patent application Ser. No. 08/218,100, filed of even date herewith.

Ultrasonic foggers and fogging systems are known in the art for various applications, including, for example, humidity conditioning of indoor environments, combustion air intake conditioning for combustion based systems such as gas turbine systems, and recirculated flue gas fogging for boiler stack emission control systems. In general, "fog" means water droplets in air that have a size of the order of 10 microns or less, are relatively unstable due to their small volume as compared to their surface area, and therefore can evaporate to dryness within a receiving airstream. The water droplets are propelled by the force of compressed air at velocities high enough to assure uniform mixing through cross flow injection into a receiving air stream. Examples of ultrasonic foggers and systems are described in the following U.S. Pat. Nos.:

4,042,016
4,058,253
4,118,945
4,564,375
4,667,465
4,702,074
4,731,990
4,731,998
4,773,846

Prior art fogging devices typically have a cylindrical body or nozzle having an axial bore into which a gas (typically air) and a liquid (typically water) are injected at controlled pressures. A resonator is spaced from and opposes the outlet (discharge) end of the bore. It is understood in the art that a compressed air orifice whose inlet (stagnation) pressure is substantially higher than its discharge pressure (usually atmospheric pressure for fogging applications) will, with inlet pressure exceeding three times the outlet pressure, achieve a velocity of MACH 1 in the bore of the fogger body. At and above MACH 1, a series of standing shock waves are produced which make a pressure controlled fogging system viable. The frequency of the shock waves is related to the dimensions of the bore. During the portions of these oscillation cycles when the water feed pressure is greater than the instantaneous air pressure, water displaces much of the air flow, droplets are sheared and entrained into the air path by the pressure pulse variations, and the droplets are accelerated into a MACH 1 or greater gas stream velocity. In general, the higher the gas (air) pressure with respect to liquid (water) pressure, the smaller the droplet size. Conversely, a lower applied pressure ratio yields larger droplets. Droplet size is quite important in a number of applications. The formation of a fog cloud of droplets is also substantially influenced by the geometry and spacing of the resonator that the air-water stream encounters after leaving the bore outlet, and the geometry of the fogger outer body, particularly the front surface thereof.

Although prior art foggers have performed reasonably well, certain problems exist. One such problem is objectionable noise. It has been established that noise can be reduced by increasing the water pressure, but when this is done it is also necessary to raise the air pressure in order to obtain the pressure differential to get the desired droplet size, typically a relatively small droplet size. [As first noted above, a larger pressure differential generally produces a smaller droplet size.] However, an increase in air pressure, in addition to increasing noise and compressed air cost, can result in undesirable turbulence in front of the fogger body, and interfere with the efficient and smooth entrainment of air which is needed to effect the desirable evaporation to dryness. Also, it has been observed that prior art foggers have tended toward a pulsating type of flow that can result in inefficient fog generation and in more compressed air than necessary being used to generate the fog.

It is among the objects of the present invention to address problems of prior art fogger operation and to generally improve fogger efficiency.

It is also among the objects of the present invention to improve operation of systems in which fogged air is filtered by a filtering system.

It is also among the objects of the present invention to provide a system for removing contaminants from an air stream in an improved and efficient manner.

SUMMARY OF THE INVENTION

In accordance with an embodiment hereof, there is disclosed an ultrasonic fogger, comprising: a generally cylindrical body having an axial bore with an outlet at a front face of the body; means for coupling a gas supply and a liquid supply to the bore; at least a portion of said front face having a curved convex contour; and a resonator spaced from and opposing the outlet end of the bore. As above indicated, a consequence of the higher water and air pressures (used to achieve lower noise levels) can be undesirable turbulence and increased compressed air consumption in prior art ultrasonic foggers. In accordance with a feature hereof, at least a portion of the fogger body front face has a curved convex contour which substantially reduces turbulence, and facilitates a smooth and efficient entrainment of air into the medium reflected from the fogger's resonator. Preferably, the curved convex contour has a surface area that is at least half of the total front surface area of the fogger body. A spherical contour, having a radius of curvature that is between 60 to 80 percent of the diameter of the cylindrical fogger body, is preferred. Because compressed air reflectance, from the resonator to the fogger face, is also important to the fogger's operation,, the front face is preferably flattened in the annular region surrounding the bore outlet.

In accordance with an embodiment of the invention there is disclosed an ultrasonic fogger, comprising: a generally cylindrical body having an axial bore therethrough with an inlet at a rear face of the body and an outlet at a front face of the body; means for coupling a gas supply to the inlet end of the bore; a chamber in the body in communication with the bore; means for coupling a liquid supply to the chamber; and a resonator spaced from and opposing the outlet end of the bore. In a preferred embodiment of the invention, the body includes an inner cylindrical body portion and an outer cylindrical body portion surrounding the inner body portion, and the chamber comprises a cylindrical groove in the outer surface of the inner body portion. The chamber communicates with the axial bore via a plurality of radial feed holes. In this embodiment, the groove has a depth of about D/2 and a length of about 3D, where D is the diameter of said axial bore.

As noted above, prior art foggers have tended toward pulsating flow. The fogger liquid delivery has been found to be related to the root mean square of pulsations, and this means that an excess of compressed air was being used in propagating the pulses of fog. Applicant has determined that there were instantaneous back-ups of air at the pressure peaks. The improved fogging device hereof employs an elongated water groove which acts as an agitation chamber that pre-shears, through agitation, the liquid stream, and the pre-sheared water flow is further sheared by subsequent passage through the radial water feed holes prior to entrainment into the compressed air flow in the bore. Operation, to obtain fog droplets of a particular size, can be at a lower air to water pressure differential than in prior art foggers, and at lower noise levels.

In accordance with a further aspect of the present invention, an apparatus is set forth for humidifying and filtering an input air stream, comprising: an ultrasonic fogger which receives a fogger gas supply and a fogger liquid supply, and produces a fog in the input air stream; a filter in the path of the fogged air stream; means for determining a condition of clogging of the filter, and for producing a control signal in response thereto; and means responsive to the control signal for controlling the liquid output of the ultrasonic fogger; whereby the fogger operates in a mode of producing a higher liquid content fog that is operative to flush clean the filter. In a disclosed embodiment, the means responsive to the control signal comprises means for controlling the pressure of the gas to produce larger size fog droplets. In this embodiment, the means for determining a condition of clogging of the filter includes means for measuring a pressure differential across the filter, and for generating a control signal when the pressure differential is above a predetermined threshold.

In accordance with a further aspect of the invention, an apparatus is provided for sensing contaminants in an air stream (including, but not limited to, ozone, volatile organic compounds, and volatile inorganic compounds) and automatically fogging to capture the contaminants with fog (by absorption, adsorption, and/or adhesion). The capture process is particularly efficient, as the air and its contaminants are entrained in the region of the fogger gap. The contaminants are separated from the air stream by subsequent cooling and condensing of the fog. An embodiment of the apparatus as set forth herein comprises: an ultrasonic fogger which receives a fogger gas supply and a fogger liquid supply, and produces a fog in the input air stream; means for determining the level of contaminants in the air stream, and for producing a control signal in response thereto; means responsive to the control signal for controlling the fogging output of the ultrasonic fogger; and means for cooling the fogged air stream to condense the fog to liquid containing the captured contaminants.

Further features and advantages of the invention will become more readily apparent from the following detailed description when taken in conjunction with the accompanying drawings.

BRIEF DESCRIPTION OF THE DRAWINGS

FIG. 1 is an axial cross sectional view of an ultrasonic fogging device in accordance with an embodiment of the invention.

FIG. 2 is a radial cross-sectional view of the inner body portion of the fogging device of FIG. 1 taken through a section at the position of radial feed holes.

FIG. 3 is a cross sectional view showing a prior art fogger inner body portion and face.

FIG. 4 is a cross sectional view showing the fogger inner body portion and face in accordance with an embodiment of the invention.

FIG. 5 is a schematic diagram, partially in block form, of a fogging and filtering system in accordance with an embodiment of the invention.

FIG. 6 is a flow diagram of a routine for programming the processor of the FIG. 5 system in accordance with an aspect hereof.

FIG. 7 is a schematic diagram, partially in block form, of a fogging system for removing contaminants from an air stream, in accordance with an embodiment of the invention.

FIG. 8 is the flow diagram of a routine for programming the processor of the FIG. 7 system in accordance with a further aspect of the invention.

DETAILED DESCRIPTION

FIG. 1 illustrates an embodiment of an ultrasonic fogging device in accordance with an embodiment of the invention. A generally cylindrical outer body 106 is formed, for example, of stainless steel, and is machined to receive a generally cylindrical inner body 120, which may also be formed, for example, of stainless steel. One end of the outer body is threaded, as shown at 107, and is adapted to be fitted to a gas supply (e.g. a compressed air source, as represented at 510 in FIG. 5), the front of which abuts a seal 108. The other end of the outer body has an internal shoulder that seats (on a seal 110) the inner body 120, which has an outlet neck 122. The inner body has an axial bore 128 drilled therethrough. An elongated annular groove 126, machined in the inner body 120, forms a chamber (in the shape of a cylindrical shell) which communicates with the bore 128 via radial feed holes 124 in the cylindrical inner body 120, as seen also, in cross section, in FIG. 2. An opening is drilled in the outer body 106, and is pipe thread tapped to receive a liquid supply connection 140 that is coupled with the liquid supply (e.g. a water supply, as represented at 512 in FIG. 5) that provides liquid under pressure to the bore 128 via groove 126 and feed holes 124. The chamber formed by groove 126 improves operation of the fogger, as described further hereinbelow.

An L-shaped standoff 151 is mounted in a hole drilled in the front face of the fogger body, and terminates in an apertured ball 152 that mounts a tapered resonator plug 153 on a threaded tuning screw 156, that permits tuning of the gap or standoff distance between the front of the fogger body and the front of the resonator plug. The resonator reflects high speed air against emerging water particles or droplets in a manner that reduces the water droplet size, and deflects these minute droplets outward for cross flow mixing with air via induction into the jet stream. The droplets are formed in a tunable field whose shape can be controlled by the variable distance between the device body and the resonator.

The front face of the fogging device has a truncated dome shape. In the illustrated embodiment, the outer portion 130 of the front surface has a curved convex contour. Preferably, at least half of the total front surface area should have a convex curved contour. The central annular region 133 surrounding the bore outlet can be ground flat.

FIGS. 3 and 4 illustrate, respectively, for comparison purposes, a prior art fogger inner body portion 320 and front surface 330, and the previously described fogger inner body portion and front surface 130 hereof. In the prior art fogger body of FIG. 3, liquid (typically, water) is input to feed holes 324 via a small annular groove 316 aligned with the entering water connection. The cylindrical bore 328 of the prior art fogger is relatively short in length (having a length of no more than six times the diameter of the bore 328) and communicates with an inlet opening 370 of larger diameter. The front surface 330 of the prior art fogger device is flat, and has a chamfered edge 335 around its periphery, which was a prior art attempt at reducing turbulence.

Figure 2:
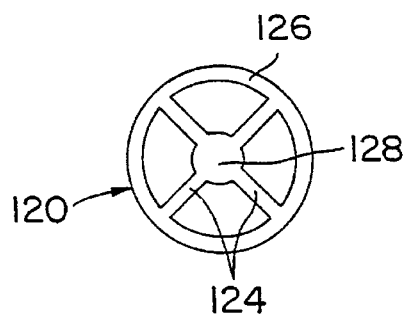

As noted in the Background portion hereof, prior art foggers (e.g. in FIG. 3) tended toward pulsating flow. The fogger liquid delivery was found to be related to the root mean square of pulsations, and this meant that an excess of compressed air was being used in propagating the pulses of fog. It was determined that there were instantaneous backups of air which, at the pressure peaks, were substantially displacing water volume and even filling the water groove (316 of the prior art fogger of FIG. 3). This was confirmed by testing using a soap solution in water, which revealed that the water connection at the groove became filled with a froth of fine bubbles. In contrast, the elongated water groove of the FIG. 1 (further shown in FIGS. 2 and 4) embodiment, wherein the groove has a depth of at least D/4 and a length (in the axial direction) of at least 2D [where D is the diameter of the bore 128] and, preferably, a depth of about D/2 and a length of about 3D [where "about" means within plus or minus ten percent], acted as an agitation chamber and agitated the soap solution into a dense lather. The chamber, formed by the groove, acts to pre-shear, through agitation, the liquid stream, and the pre-sheared water flow is further sheared by subsequent passage through the radial water feed holes prior to entrainment into the compressed air flow in the bore. [Also, in the improved fogger hereof, the bore 128 has a length of greater than six times its diameter, which facilitates operation at greater applied air pressure with subsequent greater discharge jet stream velocity.] Operation, to obtain fog droplets of a particular size, can be at a lower air to water pressure differential than in prior art foggers, and at lower noise levels.

Figure 3:
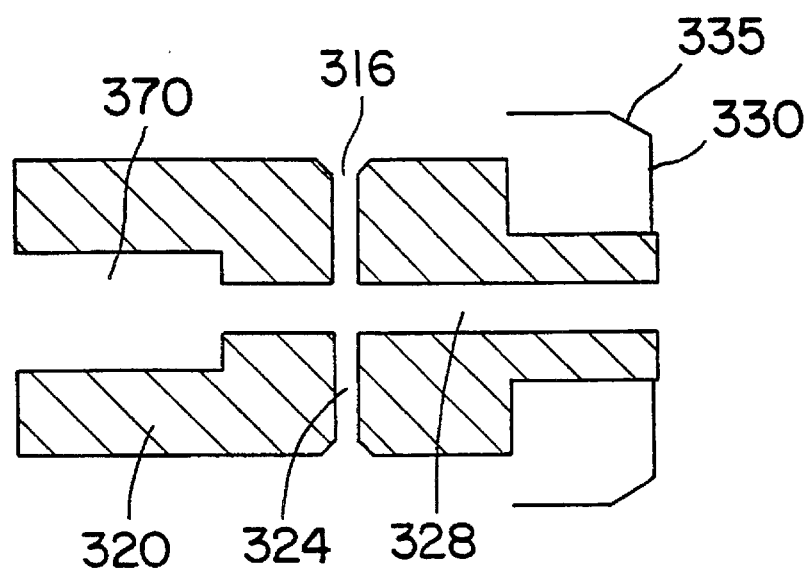
Figure 4:
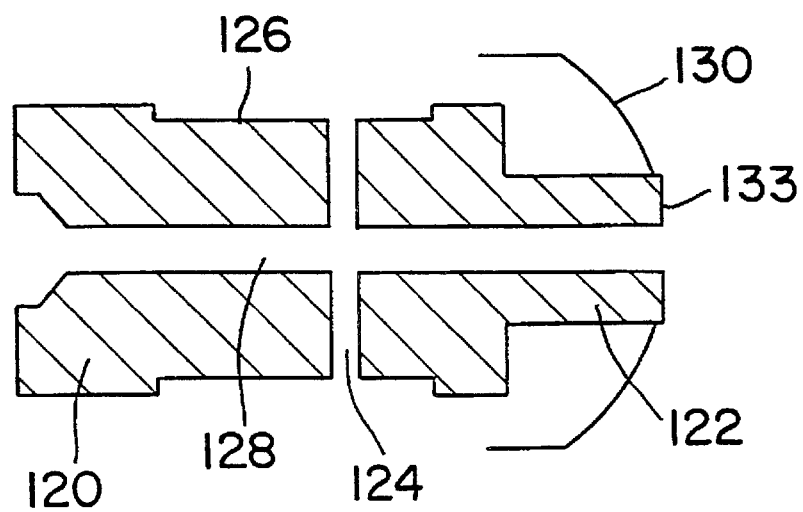

As first noted in the Background portion hereof, a consequence of the higher water and air pressures (used to achieve lower noise levels) can be undesirable turbulence and increased compressed air consumption in prior art foggers of the type shown in FIG. 3. In accordance with a feature hereof, the curved convex contour of the fogger body front face 130 substantially reduces turbulence, and facilitates a smooth and more efficient entrainment of a substantially greater volume of induced air into the medium reflected from the resonator. Preferably, the curved convex contour has a surface area that is at least half of the total front surface area of the fogger body. A spherical contour, having a radius of curvature that is between 60 to 80 percent of the diameter of the cylindrical fogger body, is preferred. The fogger body diameter can be dimensioned to be about ten times the diameter of the flat front face of the resonator 153. Because compressed air reflectance, from the resonator to the fogger face, is also important to the fogger's operation, the front face is preferably flattened in the annular region surrounding the bore outlet. The preferred flattened area is about twice the bore outlet area, but can vary from no flattened area (for relatively small capacity foggers) to three times the bore outlet area for relatively large capacity foggers.

As an example of a fogger in accordance with the features hereof, a fogger designed to disperse 160 pounds of 10 micron droplets per hour can have an axial bore diameter of 0.1 inches, a resonator face diameter of 0.125 inches, a body diameter of 1.25 inches, and a radius of 0.875 inches, using only about 20 SCFM of compressed air.

Figure 5:
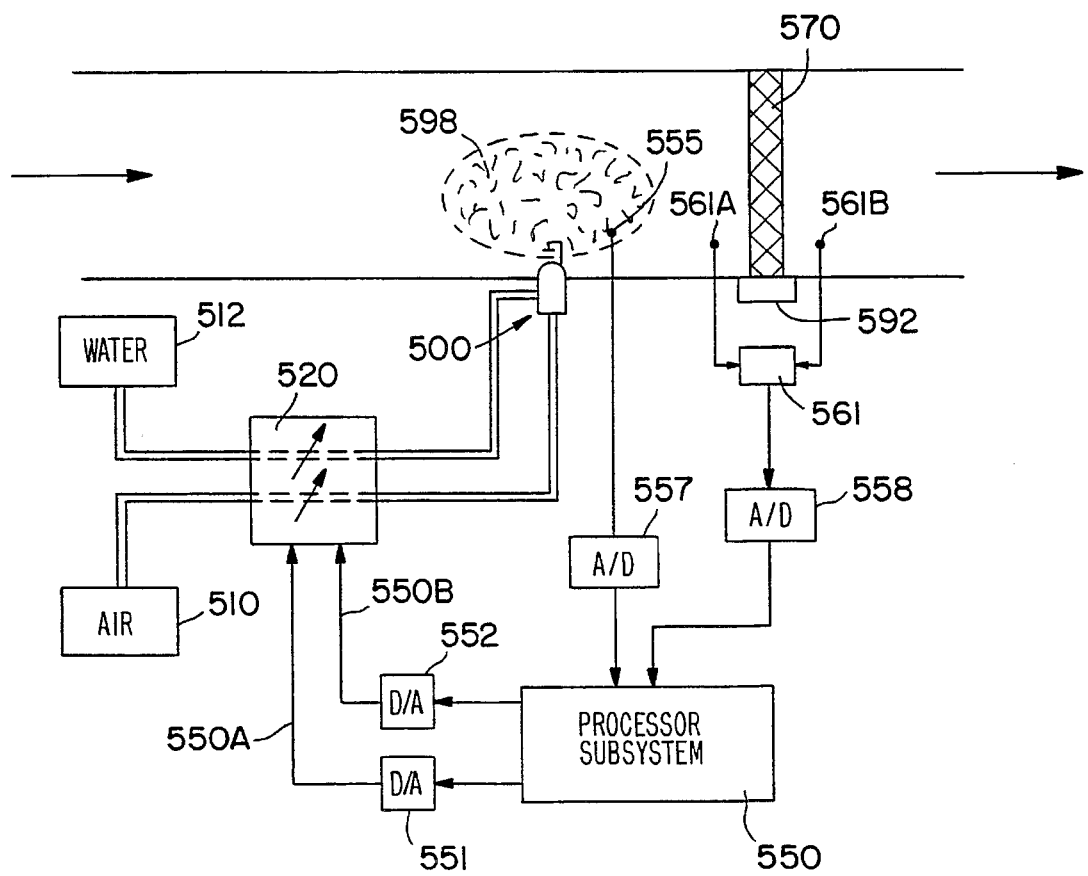

FIG. 5 illustrates an embodiment of a fogger system in accordance with a further aspect of the invention. An ultrasonic fogging device 500 is of the type described in conjunction with FIG. 1, and it is shown as being supplied by a source of compressed air 510 and water 512. [One such fogging device is shown for ease of illustration, it being understood that more than one device will normally be employed.] The flow of compressed air and water to the fogging device is controlled by a control unit 520, which includes separate pressure regulation valves for air and water. Control signals to the air and water control valves, represented in the Figure as being carried by the lines 550A and 550B, respectively, are coupled to the unit 520, via digital-to-analog converters 551 and 552, from a processor subsystem 550. The processor subsystem 550 may comprise any suitable microprocessor, such as a Model 460 processor sold by Intel Corp. or other suitable general or special purpose digital or analog processor, having the conventional associated clock, memory, and input/output peripherals (not separately shown). Coupled with the processor subsystem 550, via analog-to-digital converter 557, is a sensor (or sensors) 555, which can measure, for example, humidity or temperature, and cause control of the fogger input controls in accordance with the sensed parameter(s) in a manner generally known in the art. For example, the processor subsystem can compare its set point to the value(s) measured by sensor(s) 555, and make appropriate change in air and/or water pressure to cause return toward set point in closed loop fashion. The ultrasonic fogger 500 produces a fog cloud, as represented at 598, in an input air stream which may be, for example, air that is to be input to a gas turbine power generation system. A filter 570, which may be a prefilter or so-called "demister", filters the fogged input air. Typically, the input air and the fogger water supply may contain various types of contaminants and the filter 570 is applied for the removal of these contaminants. However, after a period of time the filter can become dirty and clogged. In accordance with a feature of the invention, the clogging of the filter is sensed, and a wetter fog is automatically generated to flush and clean the filter. In particular, a sensor 561 is provided at the filter and is operative to determine when the filter is clogged. The sensor may be of a known type, for example a pressure differential sensor that includes components 561A and 561B disposed before and after the filter, the sensor 561 generating a signal when a pressure differential of at least a predetermined magnitude is detected. When the filter is operating normally, the pressure differential thereacross will be relatively small, but as the filter gets dirty and starts to clog, the pressure differential will become substantial, and a signal will be generated by the sensor 561 and coupled, via analog-to-digital converter 558, to processor subsystem 552.

FIG. 6 shows a flow diagram of a routine for controlling the processor subsystem 550 to implement automatic cleaning of the filter 570. In the routine of FIG. 6, interrupt signals are generated periodically or at a rate determined by the operator. Upon an occurrence of an interrupt signal, the signals from the pressure differential sensor 561 are read and stored, as represented by the blocks 625 and 627. Inquiry is then made (decision diamond 640) as to whether the sensed pressure differential is above a predetermined threshold. If so, the block 650 is entered, and a control signal is issued by the processor subsystem to controller 520 to lower air pressure to the fogger 500 to a prescribed level, thereby decreasing the air/water pressure differential pressure and increasing droplet size of the generated fog. [If the air pressure was already reduced to the prescribed level during a prior pass, it is maintained.] This will result in a wetting of the filter 570, and flushing of wet contaminants which will drip down and be collected in a drip gutter 592. The block 680 can then be entered to await the next interrupt. [Alternatively, return can be immediately effected to program control.] When the pressure differential returns to below threshold, the inquiry of decision diamond 640 will be answered in the negative, the block 651 entered, and control of the air pressure valve of controller 520 will return operation to normal [or maintain it at the normal pressure, as the case may be]. If desired, wet operation for a predetermined wet cycle time can be ensured by using a cycle timer (block 655, in dashed line), before re-entering the wait block 680.

Figure 7:
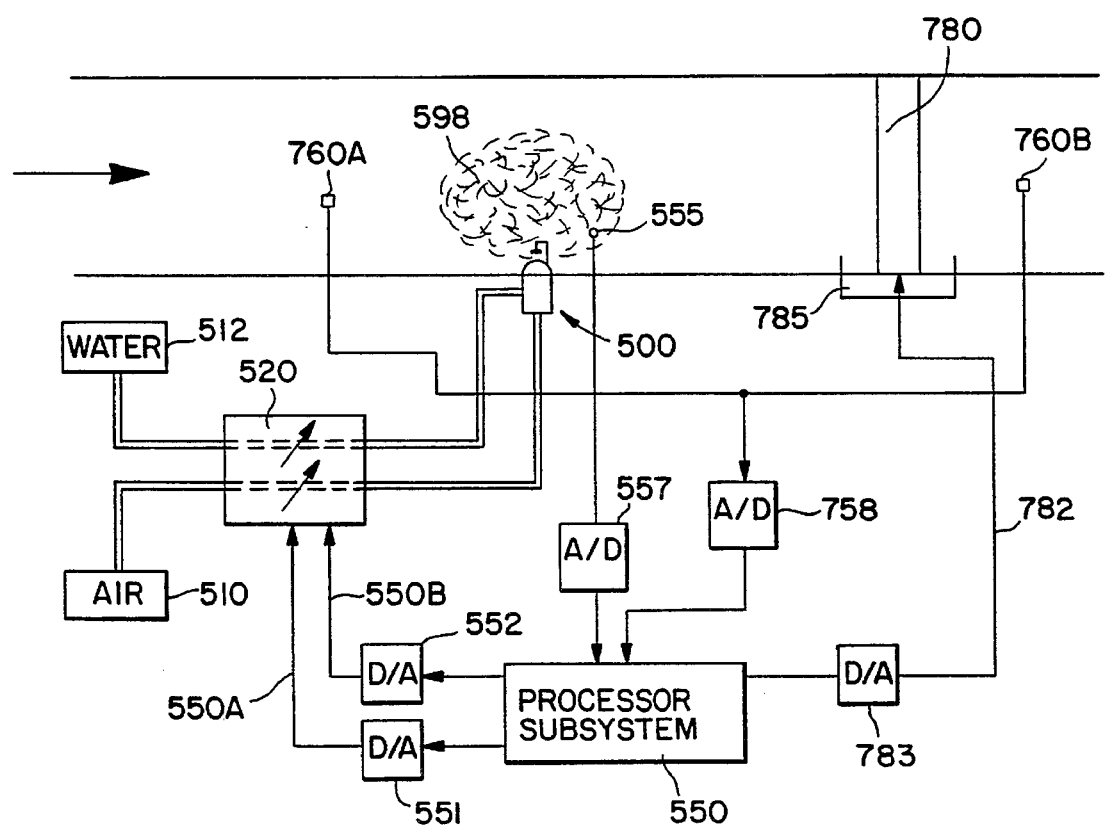

FIG. 7 illustrates a further embodiment of a fogger system in accordance with another aspect of the invention. As in FIG. 5, an ultrasonic fogging device 500 is provided and is shown as being supplied by a source of compressed air 510 and water 512 via a control unit 520. Again, one such fogging device is shown for ease of illustration, it being understood that more than one device will normally be employed. Control signals to the air and water control valves, represented as the lines 550A and 550B, are again coupled to the unit 520, via digital-to-analog converters 551 and 552, from a processor subsystem 550, of the type previously described. Also as in FIG. 5, coupled with the processor subsystem 550, via analog-to-digital converter 557, is a sensor (or sensors) 555, which can measure, for example, humidity or temperature, and cause control of the fogger input controls in accordance with the sensed parameter(s) in a manner generally known in the art. As noted above, for example, the processor subsystem can compare its set point to the value(s) measured by sensor(s) 555, and make appropriate change in air and/or water pressure to cause return toward set point in closed loop fashion. As previously indicated, the ultrasonic fogger 500 produces a fog cloud, as represented at 598, in the input air stream which, in this example, contains contaminants to be removed. Capture of contaminants is particularly efficient, as the air and its contaminants are entrained in the region of the fogger gap. In the present embodiment, coupled with the subsystem 550, via analog-to-digital converter(s) 758 are one or more sensors (760A and 760B), which may be of types known in the art, for sensing levels of contaminants in the air stream, and producing voltages representative of contaminant levels. For example, the sensors may include an ozone sensor, a VOC (volatile organic compounds) sensor, and/or a sensor that senses the presence of volatile inorganic compounds. Downstream of the sensor 760A and the fogger 500 is a cooling condenser, represented at 780, for removing the humidity and contaminants captured by the fog droplets, to be carried away by a drain represented at 785. Processor subsystem 550 controls cooling condenser via digital-to-analog converter 783 and line 782. A downstream sensor 760B can also be provided to monitor air quality after contaminant removal. It will be understood that a filter of the type described in conjunction with FIG. 5 can also be used in this system, as can the automatic sensing and cleaning system thereof.

Figure 6:
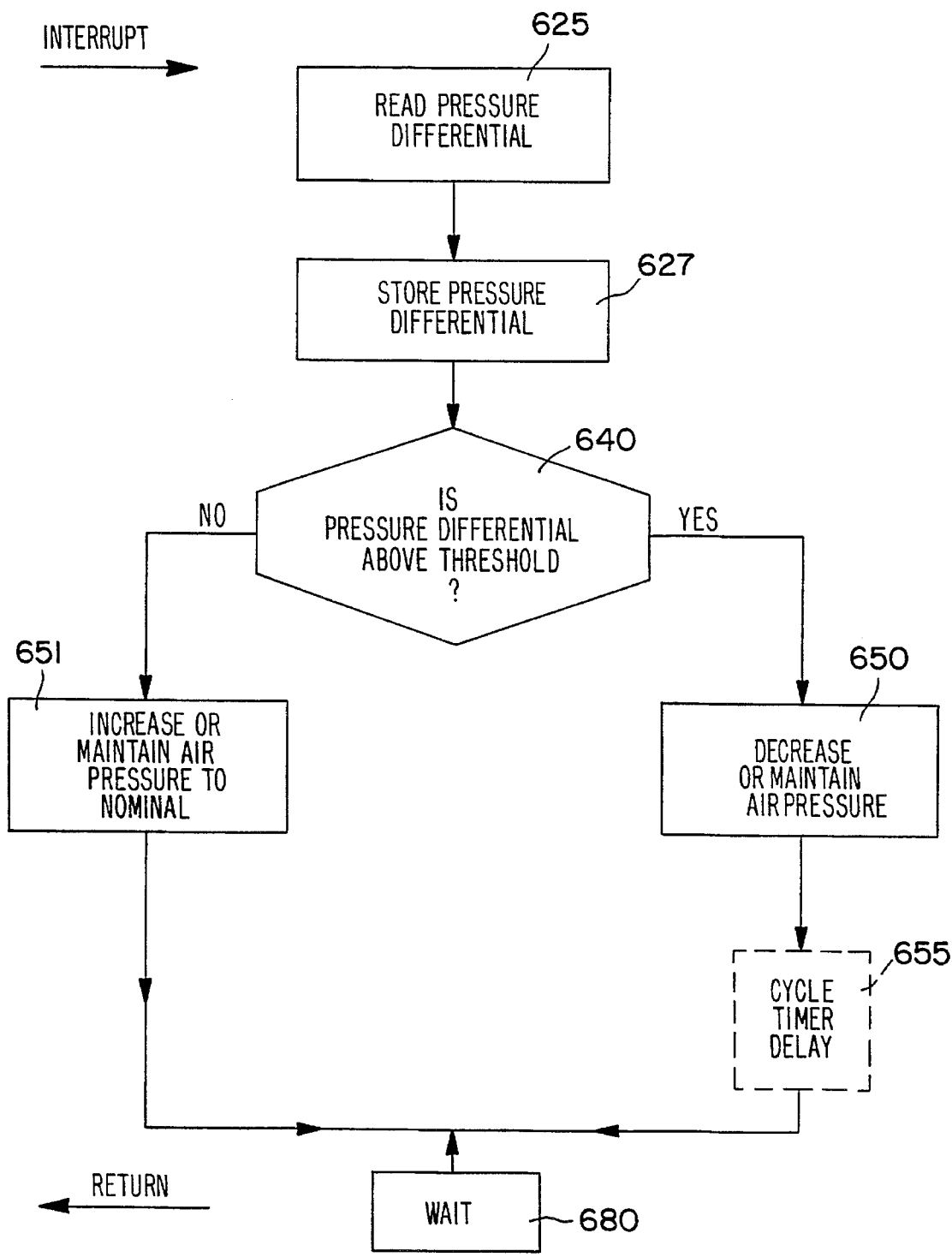
Figure 8:
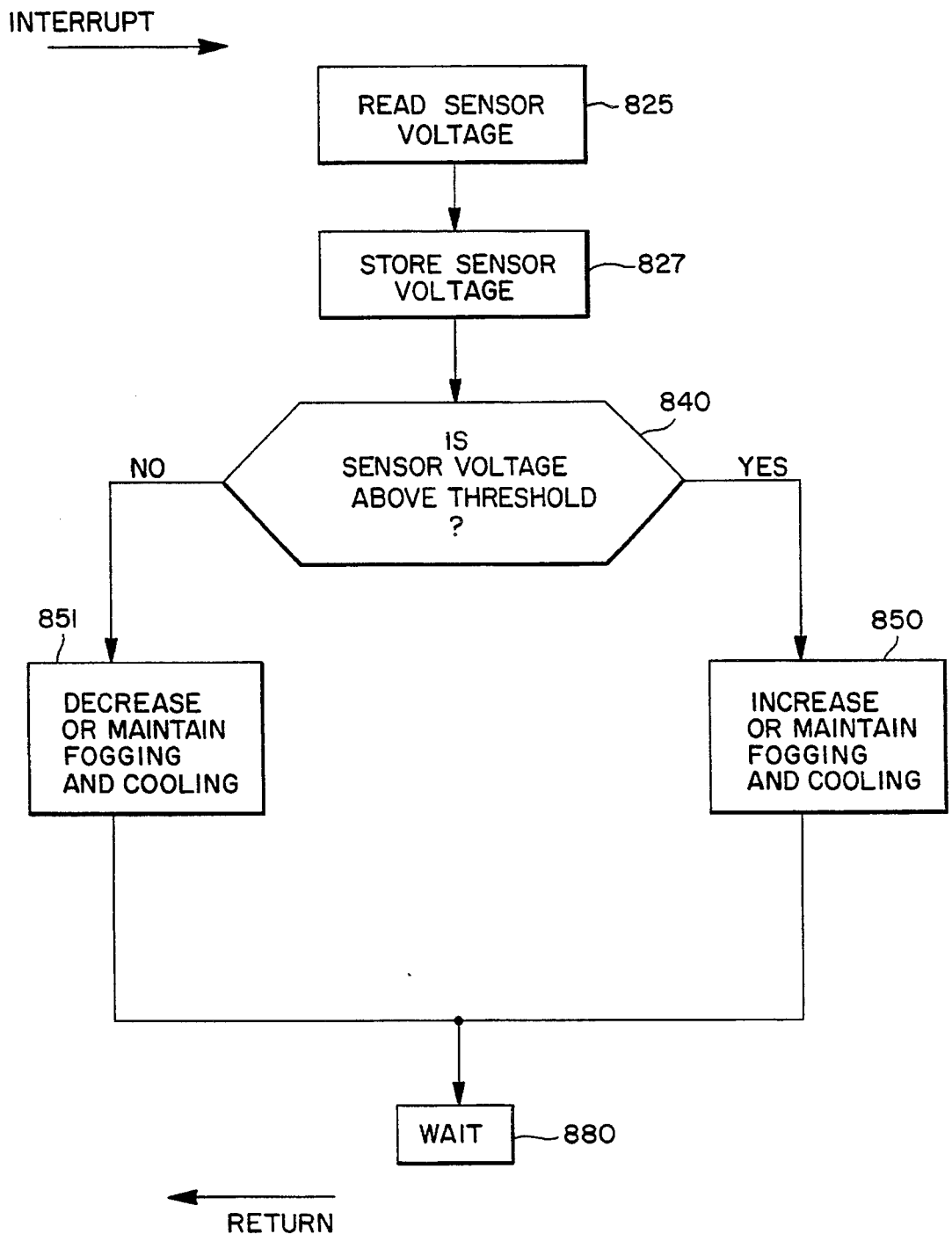

FIG. 8 shows a flow diagram of a routine for controlling the processor subsystem 550 to implement automatic removal of airborne contaminants in the FIG. 7 embodiment. In the routine of FIG. 8, interrupt signals are again generated periodically or at a rate determined by the operator. Upon an occurrence of an interrupt signal, the signals from the sensors 760 (760A, in this example) are read and stored, as represented by the blocks 825 and 827. Inquiry is then made (decision diamond 840) as to whether the voltage is above a predetermined threshold. If so, the block 850 is entered, and control signals are issued by the processor subsystem to controller 520 and condenser 780 to initiate (or maintain, if previously initiated) a fogging mode and to activate (or maintain) cooling by the cooling condenser 780. The block 880 can then be entered to await the next interrupt. [Alternatively, return can be immediately effected to program control and/or a timer can be employed as in FIG. 6.] When the sensor voltage returns to below threshold, the inquiry of decision diamond 840 will be answered in the negative, the block 851 entered, and fogging and cooling can be reduced or discontinued.

The invention has been described with reference to particular preferred embodiments, but variations within the spirit and scope of the invention will occur to those skilled in the art. For example, it will be understood that alternative digital and/or analog sensing and control techniques can be employed, and that various substances can be blended with the fogger's water supply to enhance contaminant capture, such as by pH adjustment or the like.

I claim:

1. An ultrasonic fogger, comprising:

a generally cylindrical body having an axial bore therethrough with an inlet at a rear face of said body and an outlet at a front face of said body;

means for coupling a gas supply to the inlet end of the bore;

an agitation chamber in said body in communication with said bore;

means for coupling a liquid supply to said chamber; and a resonator spaced from and opposing the outlet end of said bore.

2. The ultrasonic fogger as defined by claim 1, wherein said chamber is in the shape of a cylindrical shell within said body.

3. The ultrasonic fogger as defined by claim 2, wherein said chamber communicates with said axial bore via a plurality of radial feed holes.

4. The ultrasonic fogger as defined by claim 2, wherein said cylindrical shell is concentric with said axial bore.

5. The ultrasonic fogger according to claim 1, wherein said gas supply is air, and wherein said liquid supply is water.

6. An ultrasonic fogger, comprising:

a generally cylindrical body having an axial bore therethrough with an inlet at a rear face of said body and an outlet at a front face of said body, said body including an inner cylindrical body portion and an outer cylindrical body portion surrounding said inner body portion;

means for coupling a gas supply to the inlet end of the bore;

a chamber in said body in communication with said bore, said chamber comprising an elongated cylindrical groove in the outer surface of said inner body portion;

means for coupling a liquid supply to said chamber; and a resonator spaced from and opposing the outlet end of said bore.

7. The ultrasonic fogger as defined by claim 6, wherein said chamber communicates with said axial bore via a plurality of radial feed holes, and wherein said liquid supply is coupled to said groove at a position that is offset axially from the position of said radial feed holes.

8. The ultrasonic fogger as defined by claim 7, wherein said groove, has a depth of about D/2 and a length of about 3D, where D is the diameter of said axial bore.

9. The ultrasonic fogger as defined by claim 8, wherein said means for coupling a liquid supply to said chamber comprises a connection to said chamber that is axially offset from said plurality of radial feed holes.

10. The ultrasonic fogger as defined by claim 7, wherein said groove has a depth of at least D/4 and a length of at least 2D, where D is the diameter of said axial bore.

11. The ultrasonic fogger as defined by claim 6, wherein said groove has a depth of at least D/4 and a length of at least 2D, where D is the diameter of said axial bore.

12. The ultrasonic fogger as defined by claim 11, wherein said cylindrical shell is concentric with said axial bore.

13. The ultrasonic fogger as defined by claim 6, wherein said groove has a depth of about D/2 and a length of about 3D, where D is the diameter of said axial bore.

14. The ultrasonic fogger as defined by claim 6, wherein said cylindrical shell is concentric with said axial bore.

15. An ultrasonic fogger, comprising:

a generally cylindrical body having an axial bore therethrough with an inlet at a rear face of said body and an outlet at a front face of said body;

means for coupling a gas supply to the inlet end of the bore;

a chamber in said body in communication with said bore, said chamber being in the shape of a cylindrical shell within said body, said chamber being elongated in the axial direction and having a length of at least 2D, where D is the diameter of said axial bore;

means for coupling a liquid supply to said chamber; and a resonator spaced from and opposing the outlet end of said bore.

16. The ultrasonic fogger as defined by claim 15, wherein the length of said axial bore is greater than 6D, where D is the diameter of said axial bore.

17. The ultrasonic fogger as defined by claim 15, wherein said cylindrical shell is concentric with said axial bore.

18. An ultrasonic fogger, comprising:

a generally cylindrical body having an axial bore therethrough with an inlet at a rear face of said body and an outlet at a front face of said body;

means for coupling a gas supply to the inlet end of the bore;

a chamber in said body in communication with said bore, said chamber being in the shape of a cylindrical shell within said body, said chamber communicating with said axial bore via a plurality of radial feed holes;

means for coupling a liquid supply to said chamber, said means for coupling a liquid supply to said chamber comprising a connection to said chamber that is axially offset from said plurality of radial feed holes; and a resonator spaced from and opposing the outlet end of said bore.

* * * * *